United States Patent [19]

Smathers

[11] 4,185,401
[45] Jan. 29, 1980

[54] ARITHMETIC GAME BOARD

[76] Inventor: Helen A. Smathers, Rte. 3, Dawsonville, Ga. 30534

[21] Appl. No.: 853,260

[22] Filed: Nov. 21, 1977

[51] Int. Cl.² .......................................... G09B 19/02
[52] U.S. Cl. .................................................. 35/31 C
[58] Field of Search .................... 35/31 C, 31 E, 48 R

[56] References Cited

U.S. PATENT DOCUMENTS

| 1,867,888 | 7/1932 | Obidine | 35/31 C X |
| 2,910,786 | 11/1959 | Cohn et al. | 35/31 C X |

Primary Examiner—William H. Grieb
Attorney, Agent, or Firm—James B. Middleton

[57] ABSTRACT

An educational game board for teaching arithmetic. The game board has a group of holes in a grid arrangement with a first group of slides beneath and parallel to the holes in one direction, and a second group of slides beneath the first group of slides and parallel to the holes in the other direction. Each of the slides has a first position in which the slide is under the holes and a second position in which a hole in the slide is under the holes. There is a third group of slides disposed diagonally of the grid, each slide in the third group of slides having a first position in which the slide is under the holes and a second position in which a hole in the slide is under the holes.

3 Claims, 4 Drawing Figures

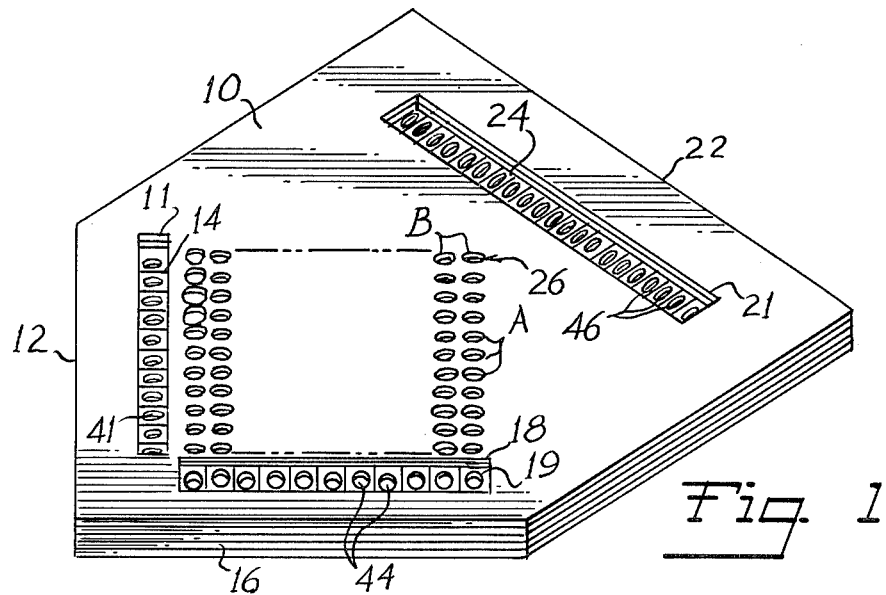
Fig. 1
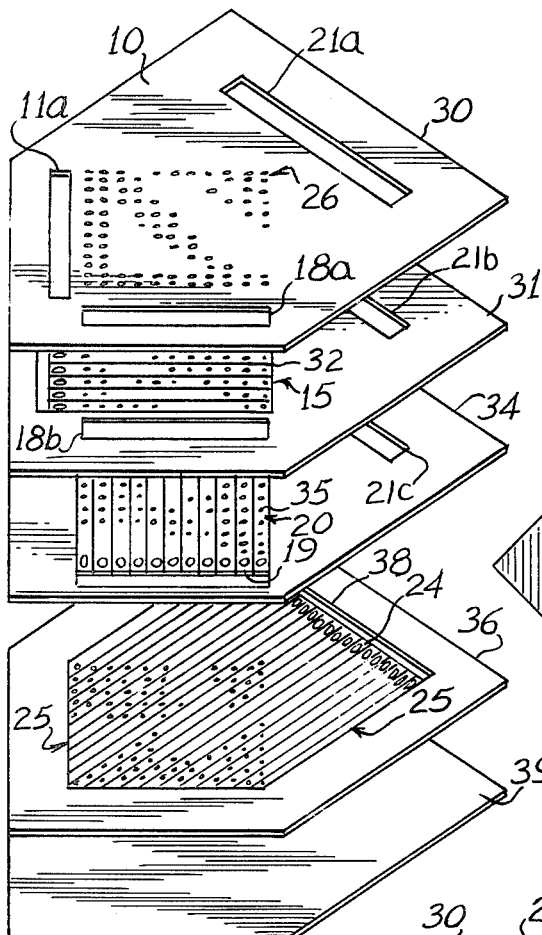
Fig. 2
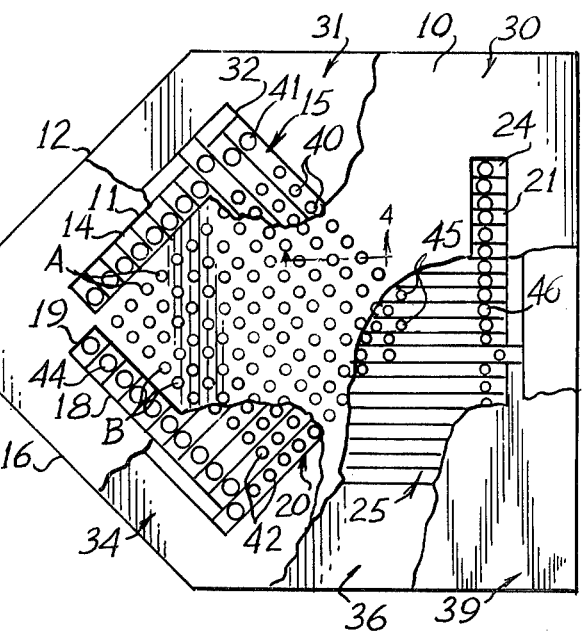
Fig. 3
Fig. 4

ARITHMETIC GAME BOARD

This invention relates generally to educational games, and is more particularly concerned with a game board having a plurality of indicator means, the various indicator means having an arithmetic relationship to one another.

When a child first begins to study formal arithmetic, the child is usually taught to memorize certain sums. The sums to be memorized usually comprise all combinations of the numbers zero through ten. As a means to assist the child to memorize the sums, many devices have been used. While many of the prior art devices may provide the information that is necessary for a child to learn, the prior devices do not sufficiently consider the motivation of the child to learn the sums, and the devices frequently allow the learning of incorrect responses on an equal basis with the learning of correct responses. Other prior devices may simply expose the child to the problems along with the correct answers. Such a routine may, in time, teach the child to recognize the correct answers, but it does not require the more difficult task of recall and will not teach the child to recall the correct answer when presented with a problem. The object of a child's memorizing the various sums is to assist the child in more complex matters when the elementary sums are necessary tools in the solution of more difficult problems. Because of this, the child must learn to recall the proper answer when presented with a given problem, and recognition of the correct answer when given does not suffice.

The present invention overcomes the above mentioned and other difficulties with the prior art devices by providing a game board having a plurality of indicator means. A first indicator means is manipulable to give a first indication and to represent one portion of a problem, e.g. one addend, and a second indicator means is manipulable to give a second indication and to represent another portion of a problem, e.g. another addend. A third indicator means is manipulable to give a third indication and to represent yet another portion of a problem, perhaps the sum. Each of the plurality of indicator means is appropriately labeled to indicate a quantity represented by that indicator means, and the arrangement is such that a problem can be set up with the indicator means in accordance with the labels thereon, and the problem can be correctly solved with the indicator means in accordance with the labels thereon. Since each group of indicator means yields a different indication there is an immediate communication to the child that his answer is "right" or "wrong." A "right" answer is therefore immediately reinforced by the person's knowing he is right, and a "wrong" answer is immediately punished in that the person knows he has failed in the task.

The game board of the present invention is such that numerous procedures can be followed using the game board. In any procedure the correct responses will be immediately indicated as correct and the incorrect responses will be immediately indicated as incorrect for a personal, or egoistic, system of reward. There is thus no reinforcement of incorrect responses so they can be quickly forgotten. All responses are learned in that a deliberate choice is made, and a motor act is performed; however, reinforcement of the correct responses, and providing no reward for the incorrect responses, hastens the forgetting of the incorrect response, or the learning that it is an incorrect response.

These and other features and advantages of the present invention will become apparent from consideration of the following specification when taken in conjunction with the accompanying drawing in which:

FIG. 1 is a perspective view of one form of game board made in accordance with the present invention;

FIG. 2 is an exploded perspective view of the game board shown in FIG. 1, illustrating the separate layers of the device;

FIG. 3 is an enlarged plan view of the game board shown in FIG. 1 with portions thereof broken away to illustrate the internal construction of the device; and, FIG. 4 is an enlarged cross-sectional view taken substantially along the line 4—4 in FIG. 3.

Referring now more particularly to the drawing, and to that embodiment of the invention here chosen by way of illustration, it will be seen by reference to FIG. 1 that the game board has an upper surface 10 here shown as pentagonal in plan view.

The upper surface 10 is provided with a slot 11 that is generally parallel to an edge 12 of the board. Through the slot 11 is seen the operating end 14 of a first group of slides 15. As will be clearly seen hereinafter, the slides 15 constitute one group of indicator means.

Parallel and adjacent to a second edge 16 of the board, there is a slot 18. The operating ends 19 of a second group of slides are seen through the slot 18, and the slides 20 constitute another group of indicator means. As here shown, the slot 18 is placed at right angles to the slot 11. Though this is a convenient angle, as will be discussed more fully hereinafter, other angles can be used depending on the various mechanical parameters involved.

A third slot 21 is provided in the upper surface 10, the third slot 21 being parallel and adjacent to a third edge 22 of the game board. The operating ends 24 of a third group of slides 25 are visible through the slot 21, the third group of slides constituting another group of indicator means. The slot 21 is disposed on the game board so that the bisector of the angle between the slots 11 and 18 bisects and is perpendicular to the slot 21.

The remaining feature of the upper surface 10 is a plurality of holes 26 arranged in a grid fashion.

Referring now to FIG. 2 of the drawing, the construction of the device is shown more clearly. Here it will be seen that the game board shown in FIG. 1 is made up of five separate layers, each separate layer being constructed and arranged to perform a given function.

The upper surface 10 is the upper surface of the first layer 30, and it will be seen that the first layer 30 has a slot 11a corresponding to the slot 11, a slot 18a corresponding to the slot 18, and a slot 21a corresponding to the slot 21. Also, the holes 26 arranged in grid fashion are in the layer 30.

The layer 30 is designed to be superposed on a second layer 31. The second layer 31 has slots 18b and 21b corresponding to the slots 18 and 21, but beneath the slots 11a are the operating ends 14 of the slides 15. It will be seen that, as here shown, there is a relatively large opening 32 in the layer 31 to receive the plurality of slides 15. All of the slides 15 are placed within the opening 32 to be generally co-planar with the layer 31. The ends of the slides 15 lying beneath the slot 11a constitute the operating ends 14.

Next, there is a layer 34. The layer 34 has the same perimetrical shape in plan view and has a slot 21c corresponding to the slot 21. Beneath the slot 18b are the operating ends 19 of the second group of slides 20. The slides 20 are arranged similarly to the slides 15 in that an opening 35 in the layer 34 receives the plurality of slides 20, the slides 20 being co-planar with the layer 34. It will be observed that there is no slot corresponding to the slot 11 since the slides 15 occupy the area of slot 11 and are above the layer 34.

A layer 36 is immediately below the layer 34 and has the same perimetrical size and shape as the other layers. The layer 36 has the operating ends 24 of the slides 25 in the area of the slot 21, and the areas of the slots 11 and 18 are occupied in higher layers by the slides 15 and 20, so there are no slots in the layer 36 corresponding to the slots 11, 18 or 21. As before, the slides 25 are contained within an opening 38 in the layer 36 in substantially co-planar relationship.

Finally, the layer 39 comprises a solid layer having the perimetrical shape and size of the above discussed layers, but with no slots, openings or the like. In the embodiment of the invention here chosen by way of illustration, the layer 39 provides a backing to hold the various parts together, and may be color coded or the like to work in conjunction with the slides 25, or the third indicator means.

Attention is now directed to FIG. 3 of the drawing for a more detailed understanding of the structure and function of the device.

The holes 26 in the layer 30 extend completely through the layer 30 so that the slides 15 in the layer 31 are normally visible through the holes. The device here shown has eleven rows A of holes 26, and there are eleven slides 15, one slide 15 being beneath and parallel to each row A of holes 26.

The opening 32 which receives the slides 15 is slightly large in one direction so that the operating ends of the slides 15 normally do not abut the edge of the opening 32, but have some room to slide.

Along the longitudinal centerline of each of the slides 15 there is a row of holes 40, the row of holes 40 in each of the slides 15 being diametrically aligned with a row of holes A in the layer 30. When the slides are in one extreme position, the holes 26 are off-set from the holes 40; but, when one of the slides 15 is moved to the opposite extremity, all of the holes in the slide 15 will be aligned with the row of holes A in the layer 30. As a result, when the slide is moved in one direction, one sees only the slide 15 through the holes 26, but when the slide is moved in the opposite direction one sees through holes and does not see the slide 15 through the holes 26.

The operating ends 14 of the slides 15 are here shown as provided with finger-size holes 41. Since these holes 41 are accessible through the slot 11 one can move any desired slide back and forth. Obviously other operating means could be used equally well, the object being to facilitate movement of a selected slide.

The slides 20 in the layer 34 are arranged generally the same as the slides 15 in the layer 31 except that the longitudinal axes are disposed at right angles to each other. Thus, the grid of holes 26 has columns of holes B, and the slides 20 are parallel to and disposed beneath the columns B. The slides 20 have rows of holes 42 that are aligned with a column B when the slide is at one extremity of motion, and unaligned when the slide is at the other extremity of motion. Operating holes 44 are accessible through the slot 18.

From the foregoing it will be understood that the holes 26 are arranged in parallel rows and columns with one group of slides under the rows on one level, and a second group of slides under the columns on another level. As a result, when one slide in each group is operated to align the respective holes, there will be one hole 26 aligned with both a hole 40 in layer 31 and a hole 42 in layer 34.

The slides 25 in the layer 36 are disposed diagonally of the rectangular shape thus far defined by the holes 26. The slides 25 are, however, aligned with a group of the holes 26, but the group is diagonally disposed. Hence, the end-most slides 25 have only one hole 45 that is either aligned or not aligned with a hole 26 in one corner of the rectangle formed by the holes 26. The adjacent slide 25 has two holes 45, and so on until the center slide 25 has eleven holes 45 and is on the diagonal of the rectangle formed by the holes 26.

The mechanical arrangement of the slides is generally the same as the above discussed slides except that, because the slides operate on the bias, the slides 25 are different lengths. As before, however, each of the slides 25 is slightly shorter than its alloted space so the holes 45 can be aligned with the holes 26 at one extremity of motion and non-aligned with the holes 26 at the opposite extremity of motion. The slides 25 are manipulable through operating holes 46 in the operating ends 24 of the slides 25, the holes 46 being accessible through the slot 21.

It will now be seen that the columns and rows of holes 26, hence the slides 15 and 20, can be disposed at many different angles and still yield the desired operation. Those skilled in the art will realize that an acute angle will reduce the space for the slides 25 while an obtuse angle will increase the space for the slides 25. For the proper mechanical operation of the device, the angle must be maintained within the range that allows the slides 15 and 20 to intersect within a reasonable distance while allowing sufficient space for the slides 25. For pedagogic reasons, however, an angle of 90° may be preferred in order to relate to the graphing of functions which the child will learn later. More generally, with the 90° angle the present device can act as the child's introduction to the matrix.

With the foregoing description in mind, the operation of the apparatus should be clear.

The device here presented by way of illustration has eleven slides 15 and eleven slides 20, and it is contemplated that these would be numbered zero through ten inclusive by means of appropriate labeling on the upper surface 10. The slides 25 would be numbered zero through twenty. The slides 15 and 20 can represent the addends in an addition problem, and the slides 25 can represent the sum. With this system, one of the slides 15 would first be moved, or operated, so that an entire row of holes 26 would be aligned with the holes 40 in a slide 15 and one would see the slides 20 through that row of holes. The slides 20 could be a special color, or have some other visually recognizable feature to assure immediate recognition of the row of holes that has "changed".

Next, a slide 20 would be operated to align its holes 42 with a column of the holes 26. Since most of the column of holes would be blocked by the slides 15, it will be understood that only one hole 26 will be seen to change. This one hole would of course be the one common hole to the slide 15 and the slide 20. When that one hole changes, the visual indication would be given by the surface of the slides 25 which may again be some distinctive color or pattern to be easily recognized.

Now, considering that an addition problem has been set up, the slide 15 representing one addend, and the slide 20 representing the other addend, the problem is to find the slide representing the sum, and that will be one of the slides 25. If the proper slide 25 is operated, a hole 45 will be aligned with the previously aligned holes 26, 40 and 42 so the surface of the layer 39 will be visible through the aligned holes, thereby indicating a correct response. Obviously, if any other slide 25 is manipulated there will be no visual change in any of the holes 26, which will indicate an incorrect response.

If subtraction problems are to be done on the device, one of the slides 25 would be selected to represent the minuend, and any of the other two groups of slides can be used to represent the subtrahend. If the slides 20 are used as the subtrahend there will be no visual change in any of the holes 26, but if the slides 15 are used there will be a row of holes to change. The opposite group of slides will be used as the slides representing the difference, and the indication of a correct response will be the same as in addition problems.

Though it has been mentioned that the surface of the layer provides a visual indication of a correct response, it will be obvious that many variations are possible. For instance, the layer 39 could be provided with holes aligned with the holes 26 and a marble or other device could drop through the game board to indicate the correct response. Also, the layer 39 could be made of light transmitting material and the showing of light through one of the holes could be the indication used.

It will therefore be obvious that the particular embodiment of the invention here presented is by way of illustration only and is meant to be in no way restrictive; therefore, numerous changes and modifications may be made, and the full use of equivalents resorted to, without departing from the spirit or scope of the invention as defined by the appended claims.

I claim:

1. A game board for solving problems wherein the parts of the problems have an arithmetic relationship to one another, said game board including a first indicator means for representing a first portion of a problem, said first indicator means being manipulable to provide a first indication, a second indicator means for representing a second portion of said problem, said second indicator means being manipulable to provide a second indication, said second indication being within said first indication, and a third indicator means for representing a third portion of said problem, said third indicator means providing a third indication, said third indication comprising a change in said second indication, said game board comprising a plurality of layers, a first layer of said plurality of layers defining a plurality of apertures therethrough, said plurality of apertures being arranged in a plurality of columns and a plurality of rows, said columns and said rows intersecting one another and being angularly disposed with respect to one another, a second layer of said plurality of layers, said first indicator means being within said second layer, said first layer defining a slot therethrough for manipulation of said first indicator means, a third layer of said plurality of layers, said second indicator means being within said third layer, said first indicator means including a first plurality of slides, each slide of said first plurality of slides being aligned with one column of said plurality of apertures, said first plurality of slides defining a second plurality of apertures therethrough, said first plurality of slides being so constructed and arranged that one slide in said plurality of slides is visible through one column of apertures of said first plurality of apertures when said one slide is in a first position, and said second plurality of apertures are aligned with said one column of apertures when said one slide is in a second position, a fourth layer of said plurality of layers, said third indicator means being within said fourth layer, said second indicator means including a second plurality of slides, each slide of said second plurality of slides being aligned with one row of said first plurality of apertures, said second plurality of slides defining a third plurality of apertures therethrough, said second plurality of slides being so constructed and arranged that one slide of said second plurality of slides is visible through one of said first plurality of apertures when said one slide of said second plurality of slides is in a first position and one of said second plurality of apertures is aligned with said one of said first plurality of apertures and said third plurality of apertures is aligned with one of said rows of said first plurality of apertures when said second plurality of slides is in a second position, said third indicator means including a third plurality of slides defining a fourth plurality of apertures, one slide of said third plurality of slides being disposed along the bisector of the angle between said columns and said rows of said first plurality of apertures and intersecting an intersection of each of said columns and said rows, each of said third plurality of slides being parallel to said one slide of said third plurality of slides and intersecting at least one intersection of said columns and said rows of said first plurality of apertures.

2. A game board as claimed in claim 1, said third indicator means being so constructed and arranged that when a selected slide of said third plurality of slides is in a first position the apertures of said fourth plurality of apertures in said selected slide are mis-aligned with apertures in said first plurality of apertures, and when said selected slide is in a second position said apertures in said selected slide are aligned with apertures of said first plurality of apertures.

3. A game board as claimed in claim 2, said first layer and said second layer defining a second slot therethrough for manipulation of said second plurality of slides, said first layer and said second layer and said third layer defining a third slot therethrough for manipulation of said third plurality of slides.

* * * * *